US006961461B2

(12) United States Patent
MacKinnon et al.

(10) Patent No.: US 6,961,461 B2
(45) Date of Patent: Nov. 1, 2005

(54) APPARATUS AND METHOD FOR MEASUREMENT, ENCODING AND DISPLAYING OF OBJECT COLOR FOR DIGITAL IMAGING

(75) Inventors: Nicholas B. MacKinnon, Vancouver (CA); Ulrich Stange, Vancouver (CA)

(73) Assignee: Tidal Photonics, Inc., Vancouver (CA)

( * ) Notice: Subject to any disclaimer, the term of this patent is extended or adjusted under 35 U.S.C. 154(b) by 588 days.

(21) Appl. No.: 09/859,966

(22) Filed: May 16, 2001

(65) Prior Publication Data

US 2002/0012461 A1 Jan. 31, 2002

Related U.S. Application Data

(60) Provisional application No. 60/204,962, filed on May 17, 2000.

(51) Int. Cl.[7] .............................. G06K 9/00; G06K 9/34
(52) U.S. Cl. ....................... 382/164; 382/167; 345/426; 345/593
(58) Field of Search .......................... 382/141, 162–169, 382/171, 173–180; 345/426, 593; 356/302, 303, 319; 358/518–520, 523

(56) References Cited

U.S. PATENT DOCUMENTS

| | | | | |
|---|---|---|---|---|
| 4,867,563 A | | 9/1989 | Wurm et al. ................. 356/328 |
| 5,369,481 A | | 11/1994 | Berg et al. .................. 356/319 |
| 5,438,651 A | * | 8/1995 | Suzuki et al. ................ 345/592 |
| 5,546,195 A | * | 8/1996 | Arai .............................. 358/518 |
| 5,555,085 A | * | 9/1996 | Bogdanowicz et al. ...... 356/300 |
| 5,592,626 A | * | 1/1997 | Papadimitriou et al. ..... 718/102 |
| 5,745,103 A | * | 4/1998 | Smith ........................... 345/601 |
| 5,917,965 A | * | 6/1999 | Cahill et al. ................. 382/305 |
| 5,943,057 A | * | 8/1999 | Ohba ............................ 345/419 |
| 5,974,168 A | * | 10/1999 | Rushmeier et al. .......... 382/141 |
| 6,301,383 B1 | * | 10/2001 | Ito et al. ...................... 382/162 |
| 6,405,367 B1 | * | 6/2002 | Bryant et al. ................ 717/115 |
| 6,539,420 B1 | * | 3/2003 | Fields et al. ................. 709/206 |

FOREIGN PATENT DOCUMENTS

| | | | | |
|---|---|---|---|---|
| EP | 0 599 495 A1 | | 6/1994 | ............ H04N/1/46 |
| EP | 0781036 A1 | * | 6/1997 | ............ H04N/1/60 |
| EP | 0 781 036 A1 | | 6/1997 | ............ H04N/1/60 |
| EP | 0 891 077 A2 | | 1/1999 | ............ H04N/1/60 |
| EP | 0891077 A2 | * | 1/1999 | ............ H04N/1/60 |
| EP | 1 079 605 A2 | | 2/2001 | ............ H04N/1/60 |

OTHER PUBLICATIONS

Robert W. G. Hunt, "How to Shop on the Web Without Seeing Red" Eighth Color Imaging Conference, Nov. 2000, pp. 2–7, Copyright No. XP00218331.

* cited by examiner

*Primary Examiner*—Bhavesh M. Mehta
*Assistant Examiner*—Yubin Hung
(74) *Attorney, Agent, or Firm*—Graybeal Jackson Haley LLP

(57) ABSTRACT

Methods, systems, devices and the like for measuring, encoding and displaying of object color for digital imaging, to control the apparent color of an item under different lighting or display conditions. The present invention helps provide accurate color for such items, both on the internet and in other situations, and can, if desired, determine whether a display screen is accurately displaying the color and also correct the image on the screen if it is not accurate. Also, probes suitable for taking accurate measurements of the intrinsic color characteristics, or intrinsic wavelength-dependent response, of an object, and software or databases that provide information for a variety of lighting situations and light sources.

2 Claims, 11 Drawing Sheets

A Illumination

D50 Illumination

D65 Illumination

F11 Illumination

Figure 14a
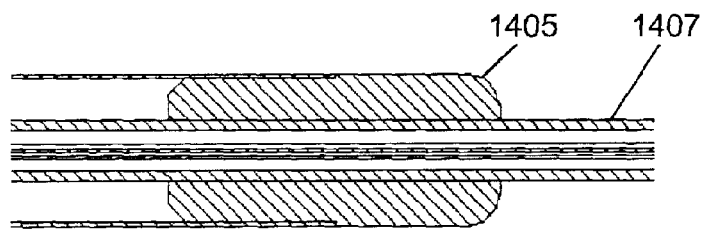
Figure 14b
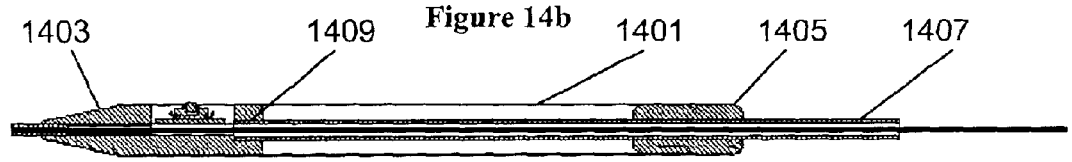
Figure 14c
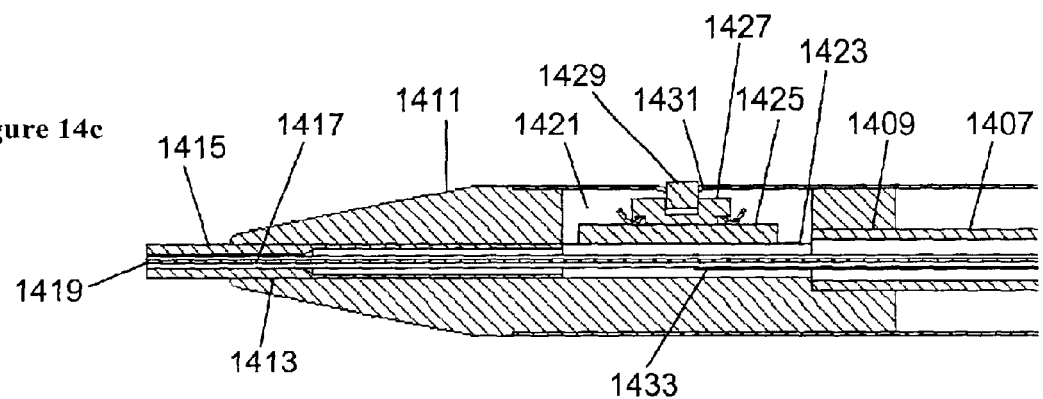
Figure 15a and 15b
Figure 15a
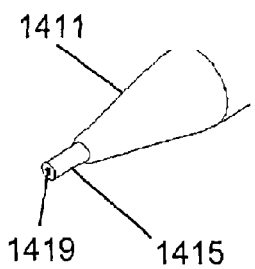
Figure 15b
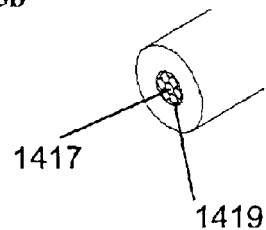

APPARATUS AND METHOD FOR MEASUREMENT, ENCODING AND DISPLAYING OF OBJECT COLOR FOR DIGITAL IMAGING

CROSS-REFERENCE TO RELATED APPLICATION

The present application claims priority from U.S. provisional patent application No. 60/204,962, filed May 17, 2000.

FIELD

This invention relates to measurement and characterization of object interaction with visible light by spectrophotometry, calculating the expected reflectance under various conditions of illumination, and encoding this information to display an accurate color rendering of the object when a digital image of the object is transmitted to a display device for viewing.

BACKGROUND

The apparent color of an item, such as a shirt or a car, can change dramatically depending on the light shining on the item. For example, a dress can look great under the soft lighting at the store then look ghastly under the harsh fluorescent lights at work. Similarly, people shopping on the internet are often leery of buying something that looks good on their computer screen because they cannot be sure how it will look in real life. The present invention provides systems and methods that help provide accurate color for such items, both on the internet and in other situations including, if desired, determining whether the computer screen is tuned to accurately show the color. Even further, the present invention provides systems and methods can that help show the item under different lighting conditions, such as outside in Seattle on a cloudy day or in Cairo on a sunny day, or even under those fluorescent lights at work. These concepts are discussed in more scientific terms in the following paragraphs.

Discussion of the measurement of light uses a variety of terms and measurement units. Unless otherwise indicated in the text, for example by express statement or by the context, terms relating to measurement and characterization of light and color are defined by reference to Color Appearance Models, Mark D. Fairchild, Focal Press, Addison Wesley Longman, 1998 and the Handbook of Optics, CD-ROM Second Edition, sponsored by the Optical Society of America and published by McGraw-Hill, 1996.

The advent of internet commerce or e-business has resulted in a demand for on-line catalogues of products for consumer and business use. The most active and growth-oriented businesses tend to be technology related. Many customers employed at these businesses use the internet to source products required in their business. Businesses producing catalogues and brochures now require not just photographs and drawings of their products, but digital images suitable for on-line catalogues and brochures. This is one factor, as well as other factors such as digital pre-press and press technology in the printing industry, pushing product photography towards digital imaging. However, photographers that are typically experienced with the color characteristics of film-based systems may not be experienced with digital systems. This can often incur extra uncertainty, costs and delays correcting color in digital images. Additionally, while the product vendor often has control over how the image is captured, there can be a number of problems in the image display process that can interfere with product presentation.

Turning to a general discussion of the nature of light, as well as color, color perception and color imaging, light is a form of energy. It has been described as both electromagnetic waves and photons. The color of light is related to the amount of energy carried by the photon or electromagnetic wave. The color of light is most commonly referred to by its wavelength. Wavelength is typically measured in micrometers ($10^{-6}$ m) or nanometers ($10^{-9}$ m). The relative distribution of photons of various wavelengths (or energies) of a given source of light is known as the energy spectrum (commonly abbreviated to spectrum) of the light source.

Examples of light sources include the sun, regular incandescent lights, and fluorescent lights. The solar illumination at the Earth's surface typically varies a few percent across a 20 nm step in the visible wavelength range and intensity of an incandescent filament lamp typically varies no more than 10% across a 20 nm increment of wavelength in this range. Conversely, a fluorescent lamp can have a 20 times (2000%) change in intensity across a step of less than 10 nm. Such variations in energy spectra can present difficulties when trying to provide accurate color rendition of an object.

Similar but less dramatic spikes in illumination profile occur with xenon flash lamps used in photography, and other arc lamp sources. When a lamp with irregular spectral emission illuminates an object with irregular spectral reflection, color appearance can change significantly. For example, as noted above, a dress that looked good under halogen lamps at the store can look terrible in the fluorescent lights of an office. The phenomenon of an object that changes in perceived color under different types of nominally "white light" illumination is known as metamerism. A related effect is the commonly observed greenish cast in the color of a photograph caused by the green spike in fluorescent lights when the film color response is balanced for daylight or tungsten lighting.

The light from the light source shines on a given object; the relative amount of light reflected by an object under illumination is called its reflectance spectrum. The reflectance spectrum is one part of the set of intrinsic color characteristics, which can be referred to as the "intrinsic wavelength-dependent response," of any given object, such as a car on the street or an apple on a table. Typically, the apparent color of an object to a human eye is a result of the reflectance spectrum of the object under a given energy spectrum. Other factors such as fluorescence can also affect the apparent color of the object. The apparent color of a given object under a given illumination can be referred to as the illumination-dependent color of the object. These and other color characteristics can be measured.

The human eye responds differently to different wavelengths. It is more sensitive to some wavelengths than others. The typical human eye can detect wavelengths of light from about 400 nm to about 700 nm. Human color vision is trichromatic; the eye's color detectors, known as cone cells, detect three overlapping ranges of wavelengths, generally in the red, green and blue ranges. The brain determines the relative response of the three kinds of color-photoreceptors of the eye and interprets this as color.

As technology has evolved people have measured light and color using various instruments. Color rendition in photographic or digital imaging is the process of trying to encode enough of the intrinsic color characteristics of an object being illuminated and imaged so that the human eye, when viewing the object in the rendered image, can interpret the color as intended by the image creator. In order to render color appropriately, the image creator preferably has adequate knowledge of the color characteristics of the light source or illumination, the object being imaged, and the device and recording medium so that the image creator can adjust the image as desired.

These and other concepts relating to light and color characteristics are discussed, for example, in the following references. U.S. Pat. Nos. 5,555,085; 5,369,481; 4,867,563; Handbook of Optics, CD-ROM Second Edition, sponsored by the Optical Society of America, McGraw-Hill, 1996; Professional Lighting Handbook, Second Edition" V. Carlson, S. E. Carlson, Focal Press, Butterworth-Heinemann, 1991; Color Appearance Models, Mark D. Fairchild, Focal Press, Addison Wesley Longman, 1998; Electronic Display Measurement, Peter A. Kellar, John Wiley & Sons, Inc., 1997; Measuring Colour, $3^{rd}$ Edition, R. W. G. Hunt, Fountain press, England, 1998; Color Technology for Electronic Imaging Devices, Henry R. Kang, SPIE Press, Bellingham, Wash. 1997; Understanding Color, Giordano Beretta, Hewlett-Packard Company, Palo Alto, 2000.

The field of digital imaging has expanded greatly in recent years, particularly in response to the growth of the internet. Products that were previously marketed using printed brochures, catalogs, and in magazine advertisements, are now marketed over the internet via web sites and e-mail. In print media, on the internet and other electronic media (and elsewhere), marketers spend a great deal of time ensuring that the photographic images portraying their products are accurately or appealingly reproduced. Color is a particularly important aspect of product marketing. When such images are digitized and/or compressed for transmission over the internet a great deal of this control disappears and color presentation of products becomes undesirably variable. Additionally, although digital imaging is subject to a number of variables that can degrade image presentation and accuracy, digital imaging provides opportunities to control and correct images. There has gone unmet a need to sufficiently define and control how an object's color is presented in a digital image, on the internet and elsewhere.

The present invention can, for example, capture and/or encode accurate intrinsic color characteristics, or intrinsic wavelength-dependent response, of an object. The system associates the color information with an image of the object that can be interpreted by hardware or software such as a plug-in component of an internet browser or other program. The information can be used to condition the image hue for more accurate or desirable color rendition by adjusting color to resemble a variety of possible illumination conditions. Additionally, the software can provide compensation for the characteristics of the image display hardware and hardware settings of the user's system, as well as provide tools to adjust the display system for optimum color rendition. The present invention provides these and other related advantages.

SUMMARY

The present invention comprises apparatus, systems, algorithms, and computer-implemented methods and programming, etc., that provide accurate color measurement of an object with adequate resolution to effectively define how its appearance would be affected by differing types and qualities of illumination. The present invention also comprises methods to digitally encode such information as data within or associated with a digital image. Algorithms can interrogate the display device showing the image and correct the color representation of an object in the image to compensate for various display devices that may be used. This invention further comprises algorithms, datasets or databases that define illumination or energy spectra based on factors such as global position, date, time of day, and environmental conditions, as well as methods and systems that can modify the color representation of the object to accurately correspond to such illumination conditions. The image of the object can be static, such as a photograph, or it can comprise movement, which typically means the object is depicted in a sequence of images or depictions that together indicate movement or change, such as a movie or television show. In addition, the object can be real or virtual.

The invention further comprises a system of computer-controlled measurement devices, measurement probes, as well as software for calibrating the measurement devices and probes, for collecting and controlling measurements, analyzing measurements, and storing the information and results related to such analyses in a computer-readable format. The invention also provides software for associating the measured and analyzed values of an object with a digital image of that object, and modifying the digital image so that the color of the object can be represented accurately, or otherwise as desired, on a variety of display devices and under a variety of proposed illumination conditions.

In addition, the adjustment of the image according to the present invention can be performed in a single computer that both displays the image and contains the programming that controls the adjustments, or the adjustment can be performed remotely, wherein one computer, such as a central computer, contains the adjustment programming and another, remote terminal or computer comprising such a remote terminal displays the image. Examples of such computer networks include local area networks, fiber optic networks, the internet and the World Wide Web; the networks can, for example, be hardwired or operably connected by wireless apparatus such as cell phones, free-space optical networks, satellite networks or palm devices.

In one aspect the present invention provides a computer-implemented methods of adjusting at least one color of at least one object in a digital image comprising: a) providing the image containing the object and determining the chrominance values of the object in the image; b) providing a reference data set comprising an illumination-dependent color of the object that represents the color of the object under a desired illumination condition; and, c) adjusting the chrominance values of the object in the image using the reference data set to provide a different, desired color of the object in the image that represents the color of the object under the desired illumination condition.

In certain embodiments, the image includes at least a second object in the image, and the methods further comprise segmenting the object from a remainder of the image. The image can comprise pixels and the method can further comprise adjusting all pixels in the image that have chrominance or luminance values similar to the chrominance or luminance values of the object substantially the same as pixels corresponding to the object.

In additional embodiments, the methods can further or separately comprise obtaining the illumination-dependent color by: a) providing an intrinsic-object color of the object to illumination; b) providing at least one illumination light source reference data set comprising wavelength-dependent intensity characteristics of a desired illumination light source sufficient to define the wavelength-dependent energy distribution of the desired illumination light source; and, c) combining a tristimulus function and the intrinsic object-color of the object and the illumination light source reference data set to calculate at least one set of tristimulus values for the object when illuminated by the desired illumination light source, and therefrom determining the illumination-dependent color of the object.

The methods can also comprise adjusting the image at a remote terminal of a computer network with the computer-implemented programming able to perform the method installed on the remote terminal in combination with the image, or with such programming operating from a different location such as a central location. The computer network can comprise, for example, an internet network, a fiber optic network, or a cell phone as a carrier of the computer signal. The adjusting can adjust for any one or more of different artificial lights, different latitudes, different altitudes, different times of day and different weather situations. The illumination-dependent color of the object can be an artificially created illumination-dependent color, and the intrinsic-object color of the object can be obtained using a numerical or graphical representation of the illumination-dependent color of the object in combination with a spectrum of a reference light source illuminating the image. The methods can alternatively comprise adjusting the illumination-dependent color of the object using gamut-mapping wherein the gamut can be defined by image rendering capabilities of an image rendering device.

The image can be associated with an identifiable tag that invokes the method of adjusting or with an identifiable tag that permits the method of adjusting to be turned on by an external actuator. The identifiable tag can be a file, and the adjusting can be associated with a switch operably linked to be turned on by the identifiable tag. The methods can be performed by a computer program that can be combined with the image in a single file. The object can comprise a depiction of a real item and the intrinsic object-color of the real item can be an intrinsic object-color of the real item. The object can also comprise a depiction of an artificially-created object and the intrinsic object-color of the artificially-created object comprises predetermined assigned chrominance values.

The methods typically further comprise determining the luminance values of the object in the image and if desired adjusting the luminance values or using the luminance values to determine pixels to be adjusted. The methods can also comprise limiting the colors to be corrected to chrominance values characteristic of diffuse reflection.

In other aspects the present invention provides a computer comprising computer-implemented programming able to perform the methods described herein, as well as a computer-readable memory comprising such computer-implemented programming. The present invention also provides systems comprising probes able to detect an intrinsic object-color of an object to illumination, typically with a computer comprising computer-implemented programming as described herein. Preferably, the probe resolves the intrinsic object-color to about 5 nm, further preferably to about 2 nm. The probe can be a spectroradiometer. The systems can comprise an illumination light source having a known energy spectrum, preferably the system comprises computer-implemented programming that correlates the response from an object illuminated by illumination light from the illumination light source with the known energy spectrum and therefrom determines the intrinsic object-color of the object. The systems can comprise further at least one light-blocking element surrounding the illumination light and the probe such that substantially no light other than the illumination light contacts the object at a location being detected by the probe.

In further aspects the present invention provides reference data sets comprising an illumination-dependent color of at least one object under at least two different lighting conditions. The reference data set can comprise the illumination-dependent color of an object for at least two different types of lighting conditions selected from the group consisting of artificial lights, different latitudes, different altitudes, different times of day, different weather situations, and different altitudes. The object can be static or dynamic, depicted in a sequence of images that together depict movement or change.

These and other aspects, features and embodiments are set forth within this application, including the following Detailed Description and attached drawings. The present invention comprises a variety of aspects, features and embodiments; such multiple aspects, features and embodiments can be combined and permuted in any desired manner. In addition, various references are set forth herein, including in the Cross-Reference To Related Application, that discuss certain apparatus, systems, methods or other information; all such references are incorporated herein by reference in their entirety and for all their teachings and disclosures, regardless of where the references may appear in this application.

BRIEF DESCRIPTION OF THE DRAWINGS

FIGS. 14a–c are cross-sectional views of an example of a hand-held probe according to the present invention of a color measurement system.

FIGS. 15a–b are side front elevational views of the tip of the probe of FIGS. 14a–c.

DETAILED DESCRIPTION

Figure 1:
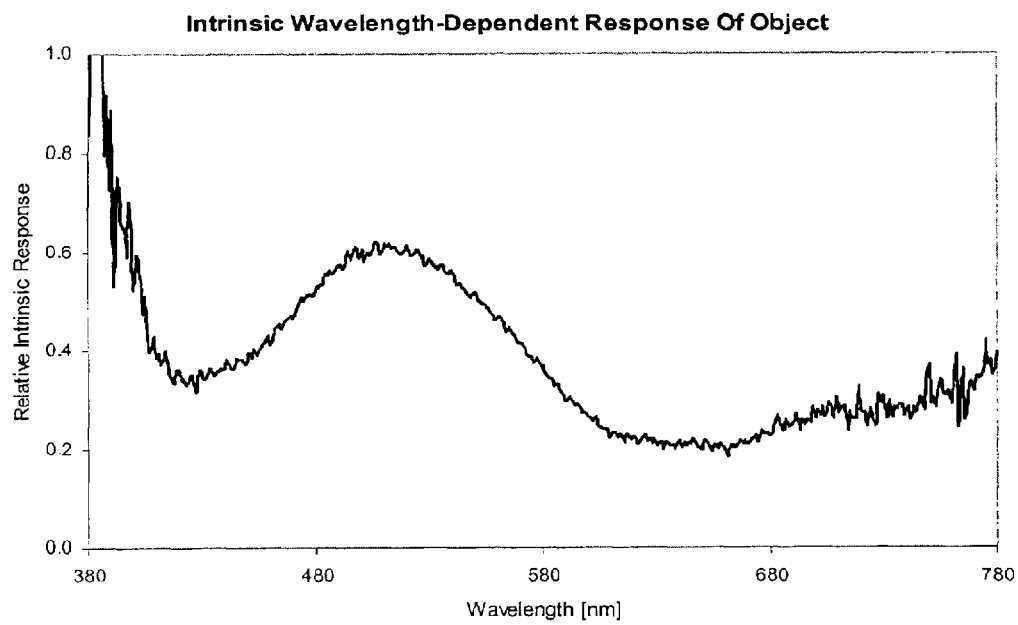
FIG. 1 is a graph depicting the intrinsic wavelength-dependent response of an object.

The present invention provides devices, systems, methods and the like to control the apparent color of an item under different lighting or display conditions. The present invention can help provide accurate color for such items, both on the internet and in other situations, and can, if desired, determine whether a display screen is accurately displaying the color and also correct the image on the screen if it is not accurate. In some embodiments, the present invention comprises a probe suitable for taking accurate measurements of the intrinsic color characteristics, or intrinsic wavelength-dependent response, of an object, and software or databases that provide information for a variety of lighting situations and light sources. The present invention also provides methods and apparatus for encoding desired color characteristics or information with an image such that the color of the image can be readily controlled at a remote display site, either at the display site itself or from another location.

All terms used herein, including those specifically described below in this section, are used in accordance with their ordinary meanings unless the context or definition indicates otherwise. Also unless indicated otherwise, except within the claims, the use of "or" includes "and" and vice-versa. Non-limiting terms are not to be construed as limiting unless expressly stated (for example, "including" means "including without limitation" unless expressly stated otherwise).

The scope of the present invention includes both means plus function and step plus function concepts. However, the terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

A recorded image, of a scene or an object in a scene, is an array of information that represents the light emitted from the scene or object. The spectrum of such emitted light depends on the illumination provided by one or more light sources, and is collected by a lens or other optical device, and focused onto a photosensitive surface. When that array of information has been converted to an array of numbers it becomes a digital image. A digital image can be created by directly with a digital camera or indirectly using a digital scanner on a black and white or color photograph (or other medium). Digital cameras and scanners are known in the art and are commercially available from suppliers such as Kodak Company, Rochester, N.Y. and Hewlett-Packard, Palo Alto, Calif.

Digital images can be represented in a variety of ways. One common way 2-D approach is to define an array of points in an image using an X-Y rectangular coordinate system and to assign a color value at the position defined by the coordinates; similar approaches can be used for 3-D images as well. Such a point in an image is known as a pixel. The numerical value of the pixel represents the color at that point in the image.

The color response of the imaging device is usually matched to the color response of the human eye. A common way of defining a pixel's color is to assign a numeric value to represent the intensity of each of the red, green and blue colors detected by the imaging device. This is referred to as RGB color and can, if desired, be defined by three 8-bit digital words, representing 256 possible intensity values for each of the R, G and B values. This color-encoding scheme allows definition of over 16 million colors.

Most imaging devices are made color sensitive by positioning a wavelength selective optical filter in front of the image sensor. This filter selects light from either the red, green or blue regions of the visible light spectrum. The light detected by the imaging device will be the integrated intensity of the light illuminating the object, reduced by any aperture in the imaging device, the light absorbed by the object and the light absorbed by the red, green or blue color filter (or other color(s), if desired) in front of the image sensor, as well as any other filters or optical elements in the image path. In a digital device the integrated intensity may be approximated by a sum of integrated intensities, each covering a small wavelength range and the sum substantially covering the wavelength range of visible light, for example:

$$E_{cam} \cong \sum_{380}^{780} E_{ill} - \sum_{380}^{780} E_{ref} - \sum_{380}^{780} E_{filt}$$

Other summations can also be used, and will be apparent to persons of ordinary skill in the art in view of the present application.

The ability of an object to reflect or absorb light is an intrinsic characteristic of an object, and is not always easy to predict (although sometimes it can be) but can be measured. These intrinsic characteristics are known as the intrinsic-object color. When the object is a real item the characteristics can be referred to as the intrinsic wavelength-dependent response of the object. When the object is an artificially-created object, such as a computer generated cartoon or a model of an airplane in a CAD design workstation, the intrinsic-object color is made up of predetermined assigned colors. Intrinsic-object color can be artificially re-assigned to a different value via manipulations by a user. For example, the a web-site can show a given car model, then show it having different colors of paint. Using the features of the present invention, the car maker can show each of the different paint colors under a variety of different lighting conditions. There are many billions of possible visible light absorption or reflection, or other light emission, profiles for an object.

Intrinsic-object color does not change when different light sources are shone on the object; intrinsic-object color is an inherent characteristic of the object. Rather, the illumination-dependent color of the object changes as the illumination of the object changes. In other words, an object may have a different perceived color under different lighting conditions, but the object itself does not change, only the perceived color changes.

A "white light source" is an illumination system that will allow the adapted human eye to perceive a white object as white. White light sources and other light sources commonly encountered in daily life typically have known spectral characteristics, or energy spectra, and the energy spectra of the light source can be determined empirically or otherwise as desired.

If the specific absorption and reflectance, fluorescence and other light emitting characteristics of an object are known, i.e., the intrinsic wavelength-dependent response or intrinsic-object color, then the perceived color of the object under various illumination conditions can be calculated in view of the present invention. This can be done by measuring the intrinsic wavelength-dependent response of an object and calculating the reflectance or other light emission spectrum under a specific illumination, and then applying relative color stimulus functions, e.g., a tristimulus function, to the emission spectrum to provide a quantitative measure of the observed energy spectrum, and then displaying that observed energy spectrum.

The response of an imaging system such as a camera or the human eye is generally predictable and has a well-defined set of "normal" characteristics. The tristimulus response of the human eye is documented, for example, in a several versions of the commonly accepted published standard of the CIE known as the CIE Standard Colorimetric Observer.

From the tristimulus values one can calculate the luminance and chrominance values in a variety of possible color spaces and using a variety of color appearance models. These models and color spaces are know in the art and are discussed in detail in reference texts such as Color Appearance Models by Mark D. Fairchild. One useful color space in the field of digital imaging is one that defines separate components for luminance and chrominance. A well accepted color space is the CIELAB space: By applying an appropriate set of mathematical transformations one can calculate the L*, a* and b* values of this color space from the measured spectral response of an object.

Typically, the luminance value comprises at least one element, L*, and corresponds to the perceived lightness (light-dark scale) of an illuminated object and the chrominance comprises at least two values, a* and b*, which can correspond, respectively, to the red-green and yellow-blue responses as described in the color opponent theory of vision; other luminance and chrominance values are possible and within the scope of the present invention. Typically the primary cause of changes in light-dark values under uniform illumination is topology.

FIG. 1 shows an example of the intrinsic wavelength-dependent response of an object as measured by a spectroradiometer. The object used for the Figure was color test pattern target number 6, bluish-green, from the Macbeth ColorChecker test pattern, a commonly used color standard.

Figure 2:
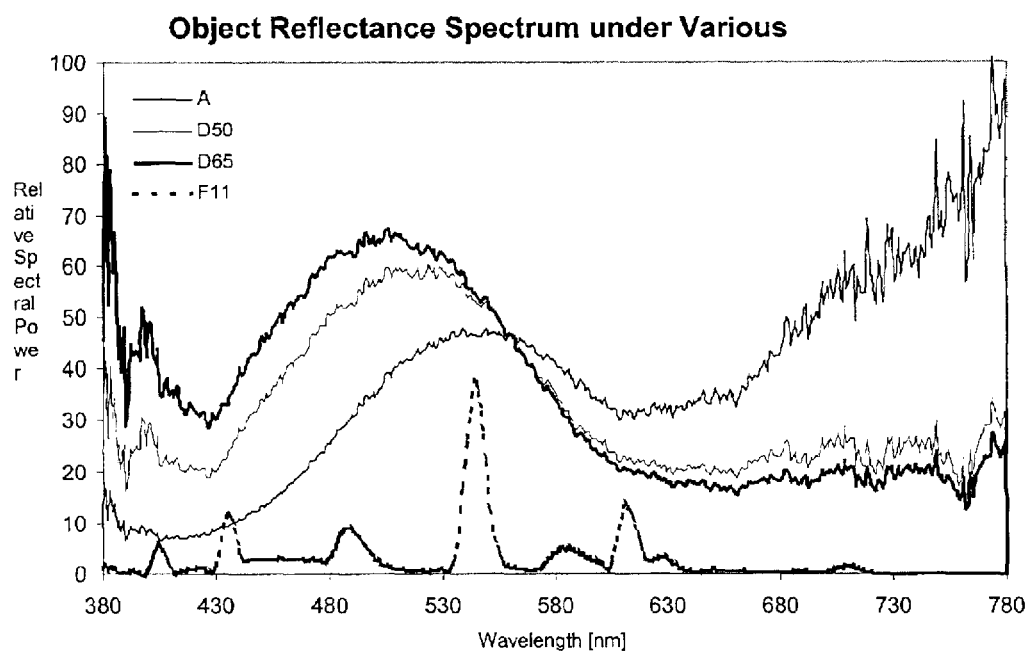
FIG. 2 is a graph depicting the reflectance spectrum of the object from FIG. 1 under four different illuminants or energy spectra.

FIG. 2 shows the calculated reflectance spectrum for the object in FIG. 1 under four different illumination conditions. The illumination values are illuminants A, D50, D65 and F11 as defined by the CIE. These illuminant examples are theoretical illumination values that correspond approximately to tungsten light (A), daylight (D50, D65), and fluorescent light (F11).

Figure 3:
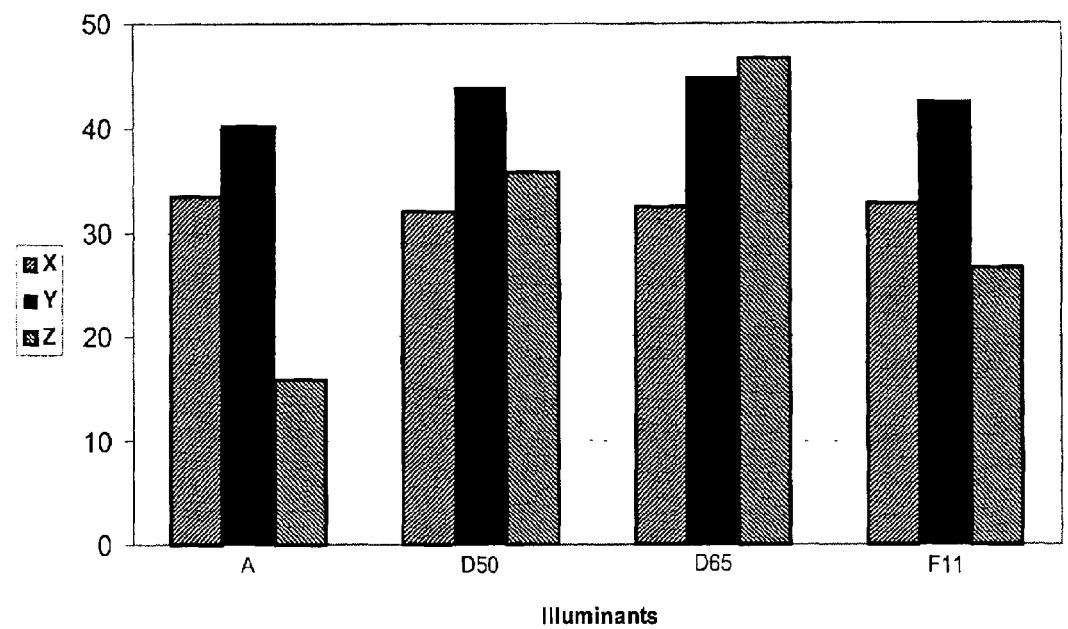
FIG. 3 is a graph depicting the relative distribution of X, Y, Z values for the object from FIG. 1 under four different illuminants.

FIG. 3 shows the application of the CEE standard observer tristimulus functions to the calculated reflectance spectra from FIG. 2 to determine the tristimulus XYZ values for the object under each illuminant.

Figure 4:
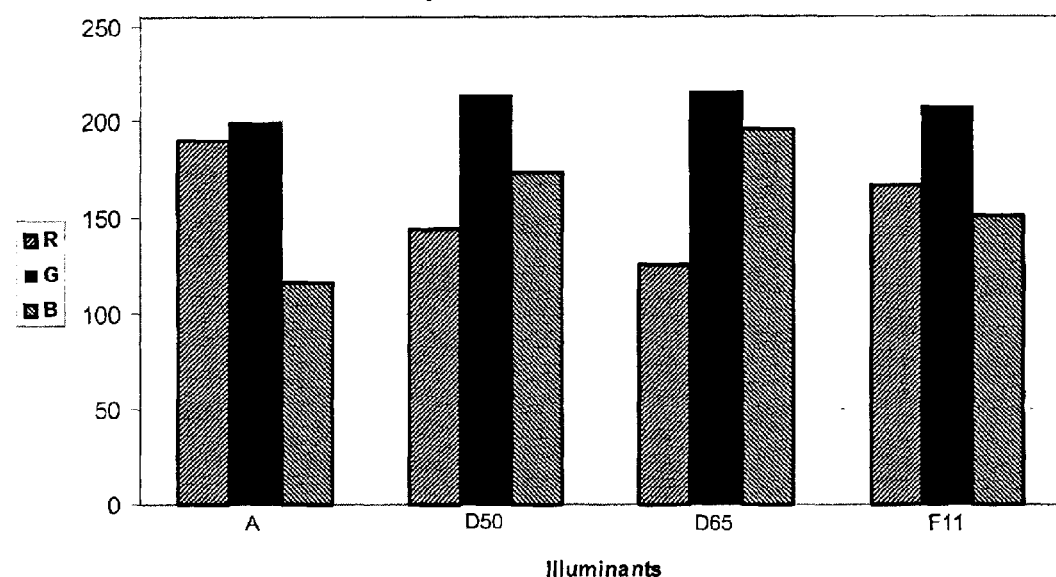
FIG. 4 is a graph depicting the relative distribution of red, green, blue digital image values for the object from FIG. 1 under the four illuminants from FIG. 3.

FIG. 4 shows the digital RGB values calculated for a 24-bit RGB image pixel corresponding to the full bright color for the object. These values are determined from a mathematical transformation for converting from the device independent XYZ color space to the device dependent RGB color space.

Figure 5:
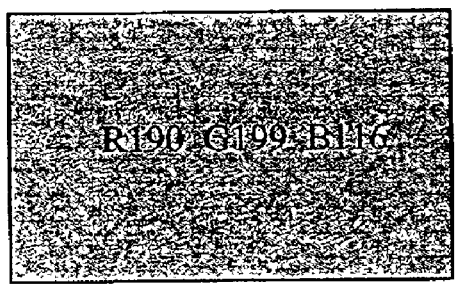
FIG. 5 is a depiction, presented both in color and numerically, of the digital RGB color of the object from FIG. 1 under four different illuminations based on values from FIG. 4.
Figure 5:
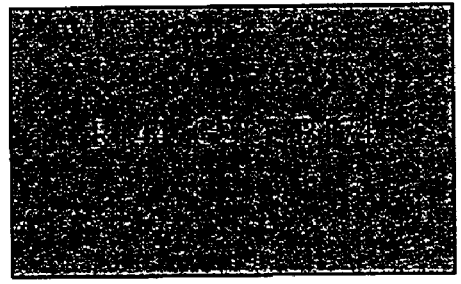
Figure 5:
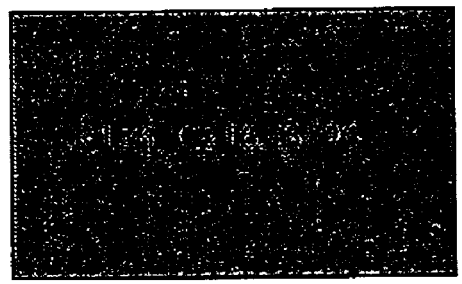
Figure 5:
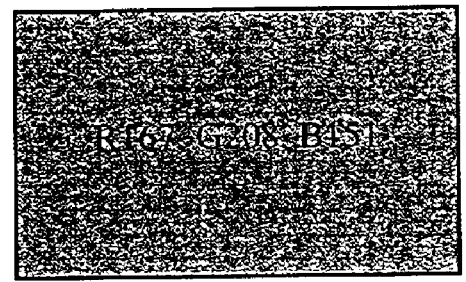

FIG. 5 depicts conceptually, both in color and numerically (which numbers correspond to the colors), the color differences for the same color patch under four illuminants as rendered for an image display monitor and then reproduced in hardcopy. The numbers in the color patches correspond to the digital RGB values for each image square. The actual colors in the printed copy of this document may not accurately depict the colors due to variations in the printer system used to create this document or other factors, but the figure is useful to demonstrate the relative differences of the perceived color of a single object under different light sources. FIGS. 3–5 are exemplary methods of presenting a numerical or graphical representation of an intrinsic object-color or color illumination-dependent color of an object.

If a digital image of an object is captured under a particular known illumination system and the luminance and chrominance values are calculated for the object from the RGB image values, then it is possible to convert specified object color values in the image to the true color values of the object under a hypothetical user-specified, or desired, illumination. This can be accomplished digitally by applying color look-up tables (CLUTs) for selected object chrominance values. Thus, the CLUTs provide one example of a reference data set comprising illumination-dependent color of the object, either directly as a set of such data or by providing data from which the illumination-dependent color can be readily determined, typically by providing an illumination light source reference data set comprising wavelength-dependent intensity characteristics of a desired illumination light source sufficient to define the wavelength-dependent energy distribution of the desired illumination light source, and then combining a tristimulus function and the intrinsic wavelength-dependent response of the object and the illumination light source reference data set to calculate at least one set of tristimulus values for the object when illuminated by the desired illumination light source, and therefrom determining the illumination-dependent color of the object. By adjusting only the chrominance values, such as the a* and b* values, the relative luminance signal that is primarily due to topology can be preserved while the color response is corrected. Alternatively, if desired, the luminance values, such as the L* values, can also be altered.

To minimize data requirements and speed up image processing, these look-up values can be limited to only selected critical colors. An example of this could be an outdoor scene in a sporting goods image where the color of a red backpack could be corrected but the color of the rock on which it is sitting or the background foliage could be ignored. The resultant reduction in data volume is particularly important for images transferred digitally over computer networks. This is referred to as segmenting the desired object from the remainder of the image, and can be specific to the object, or to any pixel in the image that contains the same color characteristics as the object prior to the adjusting, in which case such similar pixels can be adjusted to have chrominance values substantially the same as the adjusted chrominance values of the adjusted object. The desired object can be segmented from the entire remainder of the image, or from at least one second object in the image, or otherwise.

Two types of reflectance are diffuse reflectance and specular reflectance. When light interacts with an object it is either scattered or absorbed or passes through an object. When light is absorbed its energy is deposited in the object. When light is scattered it changes direction. Light may be forward scattered or back scattered. This type of scattering is often wavelength dependent. The back-scattered light that is not absorbed by an object is usually the primary component determining an object's color. Sometimes the absorbing or scattering particles may be suspended in a minimally absorbing or minimally scattering medium such as water or some types of plastic. If the surface of such a material is very smooth or polished and is of a different refractive index, it may reflect light from the surface without interacting with the material to any extent. This type of reflection is called specular reflection and the angle of reflection is usually equal to the angle of incidence. Such specular reflections will typically be of a different color than the object and therefore can be ignored if desired by properly selected CLUTs during color correction. Alternatively, specular reflections could also be modified if desired for a particular effect. Diffuse reflection tends to comprise light that has interacted more with the object and is usually what is described as an object's color. In this way the object color can be corrected without modifying the apparent gloss or sheen of the object by erroneously correcting the "highlights" generated by specular reflection. Desirable selection of CLUTs can comprise limiting the colors to be corrected to chrominance values characteristic of non-specular or diffuse reflection. Alternatively one can also, or instead, correct highlights such as specular reflection to match the type of illumination.

Another property of an object's interaction with light is fluorescence. Fluorescence occurs when an object absorbs light of one energy level and then emits light of a lower energy level. For example, in some fluorophores, blue light (which has a shorter wavelength and therefore a higher energy) is absorbed and red light (which has a longer wavelength and therefore a lower energy) is emitted. In some materials such as fluorescent paint, the light emitted from an object can contain more fluorescence than reflectance. If the fluorescence characteristic spectrum of an object is known it can be used to further enhance the color rendition model for an object.

A representative sample of chrominance values for a variety of lighting and environmental conditions can be calculated and recorded in a data array that can be associated with an image file. Intermediate lighting and environmental effects on chrominance values can be calculated by interpolation of the representative values. For example, the expected color for an object in sunlight at noon on April 15 can be predicted by interpolating between values for an object in sunlight at noon on April 1 and on May 1.

In order that object color correction is applied only to the desired object, image segmentation procedures may be used to define and mask the area of an object to be corrected. Image segmentation and object recognition software for other applications are known in the art and can be applied in view of the present application. Image segmentation and object recognition software is available from companies such as National Instruments Corp. of Austin, Tex.

The spectral absorption and diffuse reflectance characteristics of the object or objects in the image can be measured using a portable spectroradiometer or other suitable measurement device connected to a portable computing device, such as a notebook computer or hand-held personal computer. Alternatively these characteristics can be extracted from commercial or other databases of measurements, or otherwise as desired.

In certain embodiments the portable computing device comprises a portable slate type computer equipped with a color display and graphical user interface, which computer can further contain or be combined with a spectroradiometer or other spectral measurement device and a reference light source. Various computer-implemented programming (e.g., software) components can be added to the portable computing device for a variety of measurements. The computer-implemented programming, as well as reference data sets and other information discussed herein, can be stored in a computer-readable memory, which memory devices are well known in the art and can be, for example, a permanently contained memory or an easily removable device such as a floppy-disc or a CD- or DVD-based memory device. The computer-implemented programming can also be a file that can be transmitted from one computer to another over a suitable line or link, such as the internet, the world wide web, and a local area network, via modalities such as optical fibers, cell phones, and hand-held devices such as Palm-pilots™, that can carry the computer signal.

Such a file can include the computer-programming of the present invention that adjusts the apparent color of an object or an image comprising an object that has been adjusted according to the present invention. The file can also contain an object that will be adjusted according to the present invention at a remote terminal. Preferably, the file(s) containing such an object to be adjusted further comprise computer-programming that adjusts the apparent color of the object. Further, the object can be associated with an identifiable tag, such as a cookie, that assists the adjustment of the image at a remote location or terminal by an adjustment program located in a different or central computer. Such assistance can include turning on the method of adjusting by an external actuator, or invoking computer-implemented programming that interrogates the display mechanism, such as a computer display, CRT, or HDTV screen, determines the color characteristics of such display, then adjusts the object to provide a desired color to the object, preferably a color that accurately depicts the object under a desired illumination light. Such interrogation programming is an additional feature of the present invention. Additionally, the identifiable tag can be associated with a switch that can be turned on or otherwise changed by the identifiable tag.

A computer is a device, typically electronic, that can store coded data and can be set or programmed to perform mathematical or logical operations at high speed. The measurement devices are controlled by software and are interfaced to the computer system that is equipped with an operating system software such as Windows 2000 produced by Microsoft Corporation of Redmond, Wash.

The software architecture of a preferred embodiment of the system comprises the system software, the spectroradiometer measurement software, illumination/object analysis software, and digital image color association software.

Figure 6:
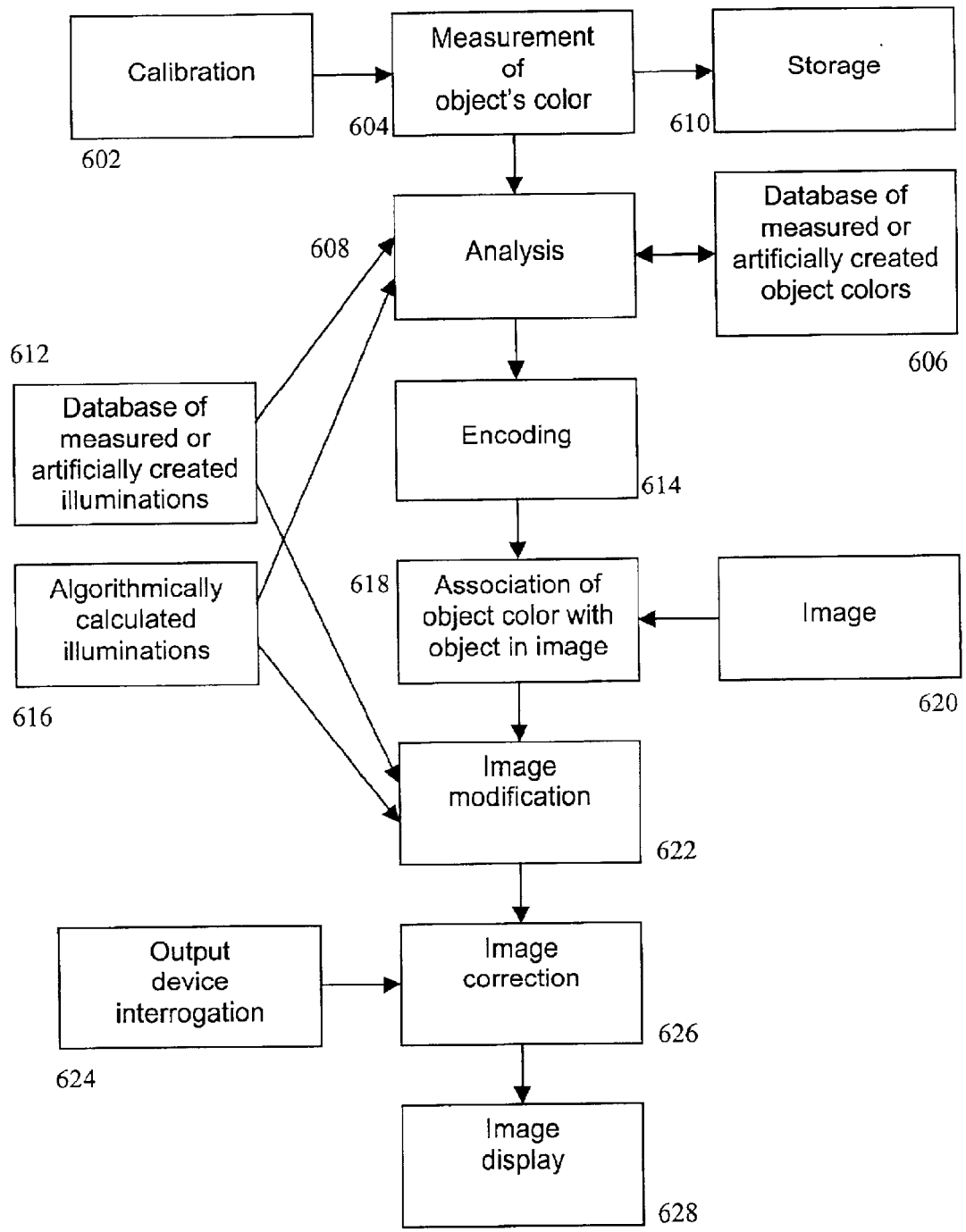
FIG. 6 is a block diagram and flow chart exemplary of a software hierarchy according to the present invention suitable for implementing certain aspects of the invention.
Figure 7:
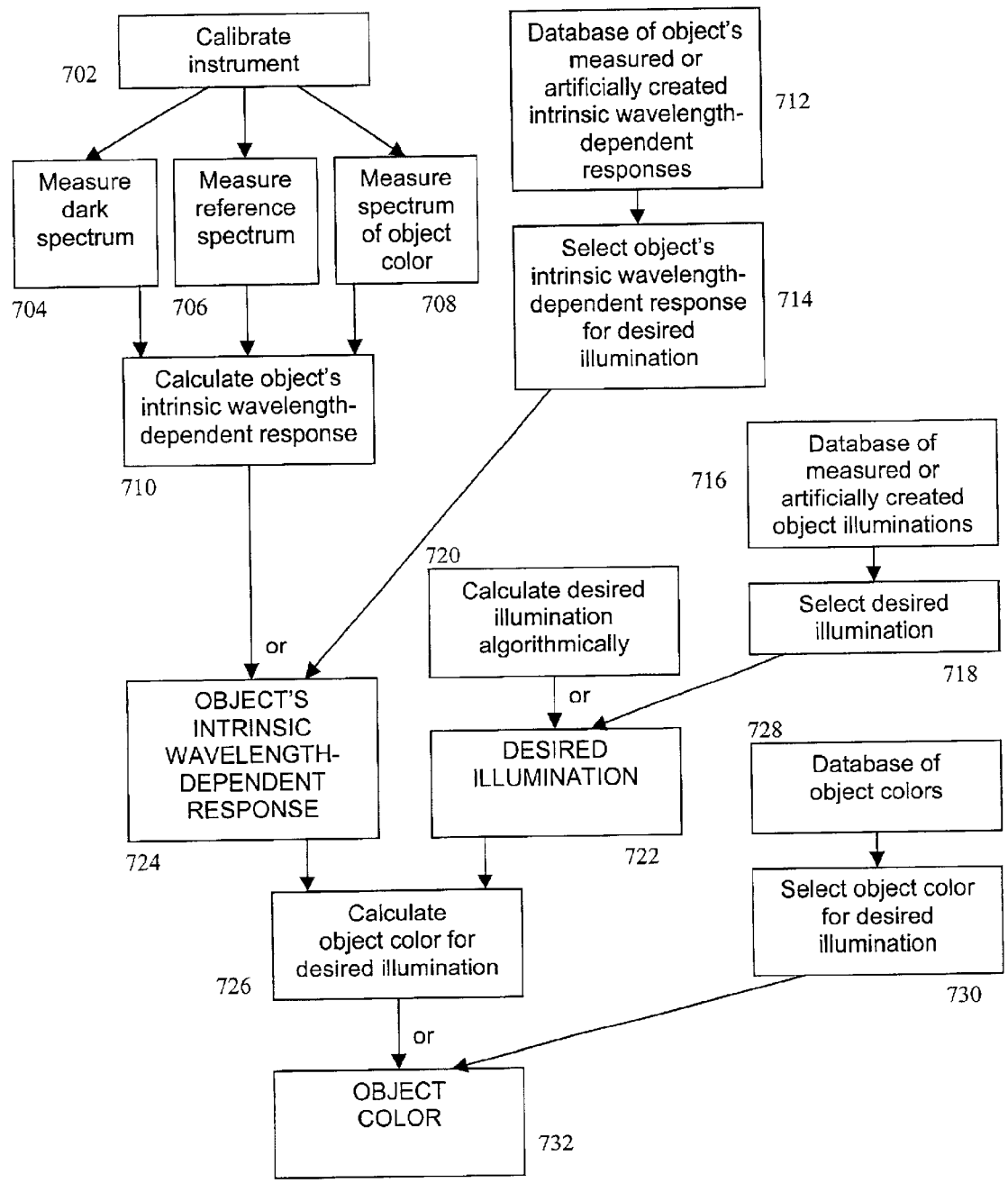
FIG. 7 is a block diagram and flow chart exemplary of an approach according to the present invention to determining the object color.
Figure 8:
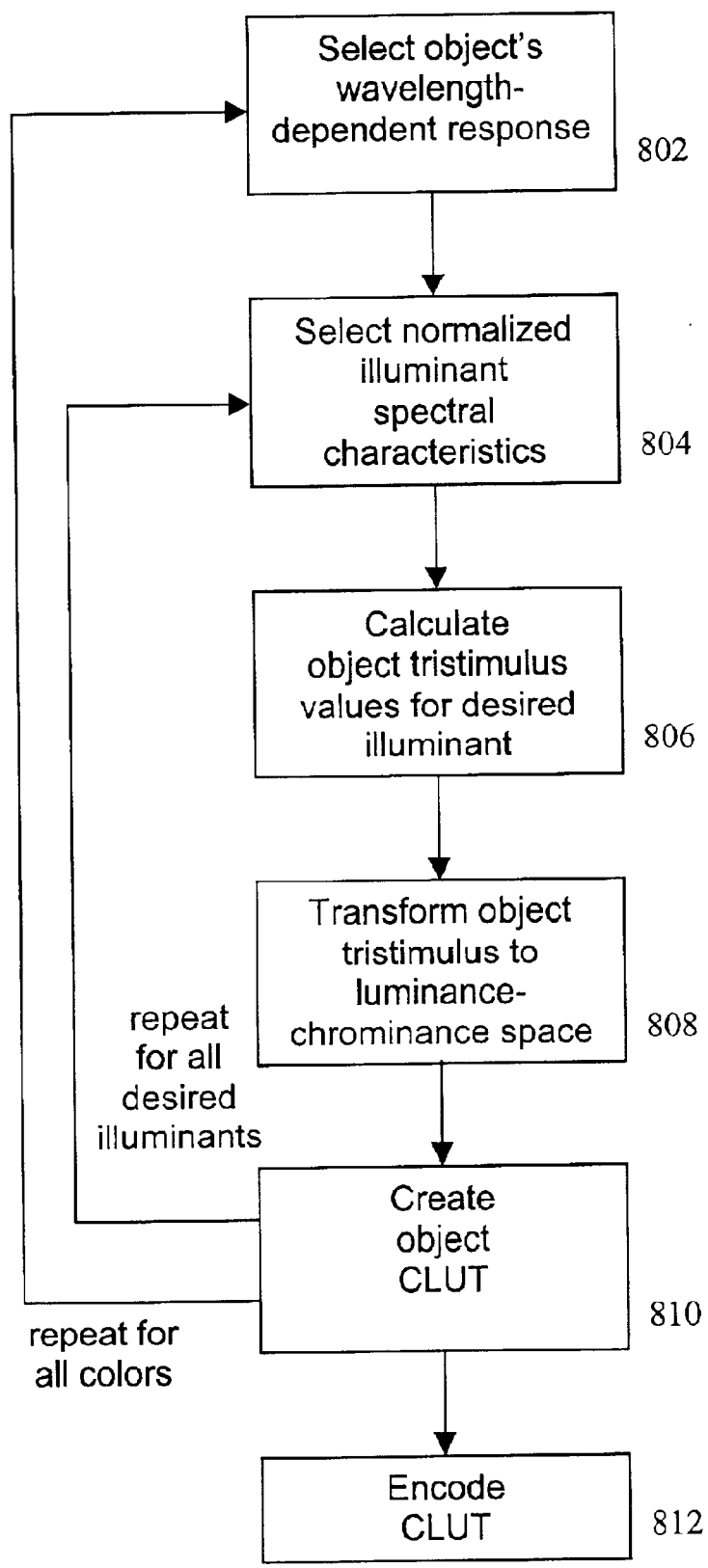
FIG. 8 is a block diagram and flow chart exemplary of an approach according to the present invention to analyzing an object color measurement and encoding the results in a color look up table (CLUT).
Figure 9:
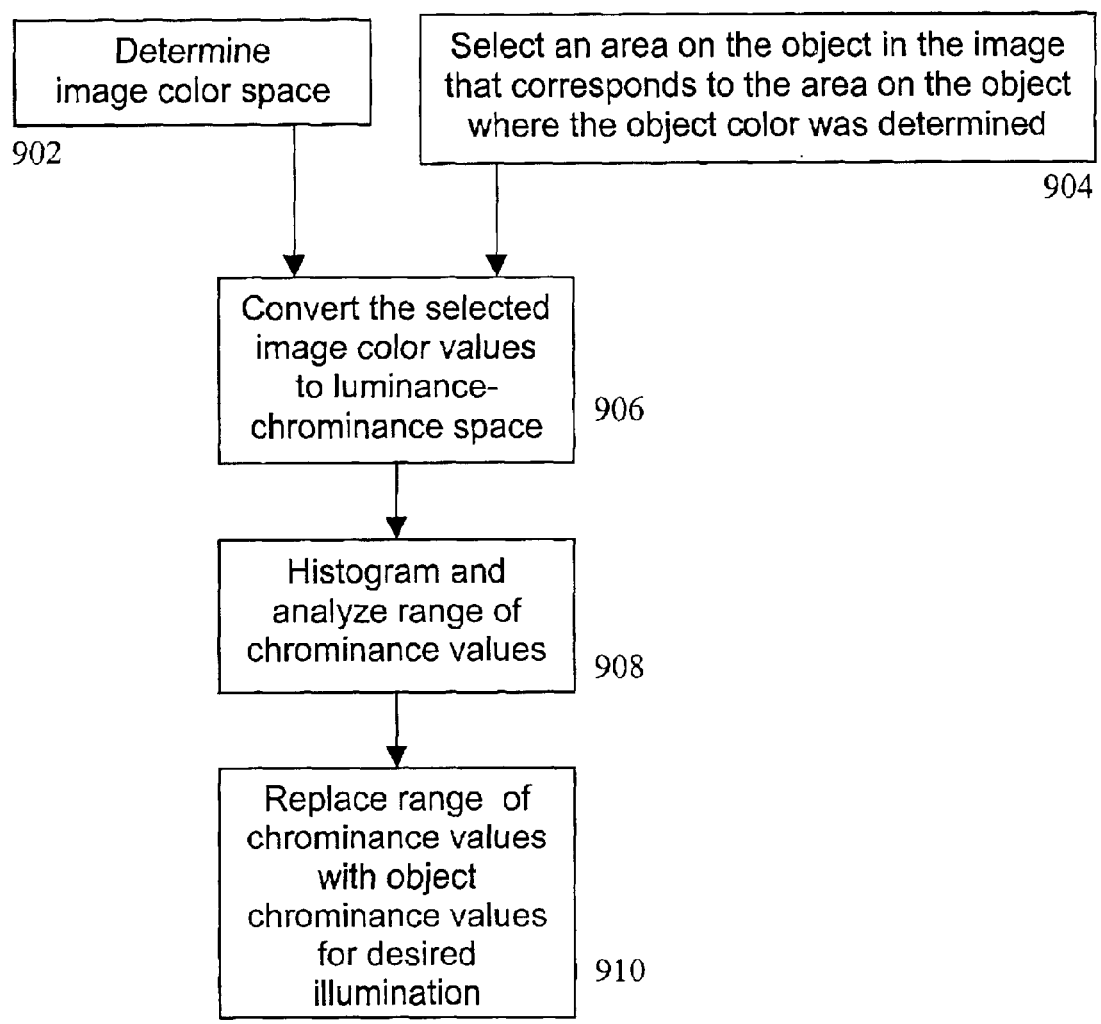
FIG. 9 is a block diagram and flow chart exemplary of an approach according to the present invention to associate the color of an object with the color of an object in an image.
Figure 10:
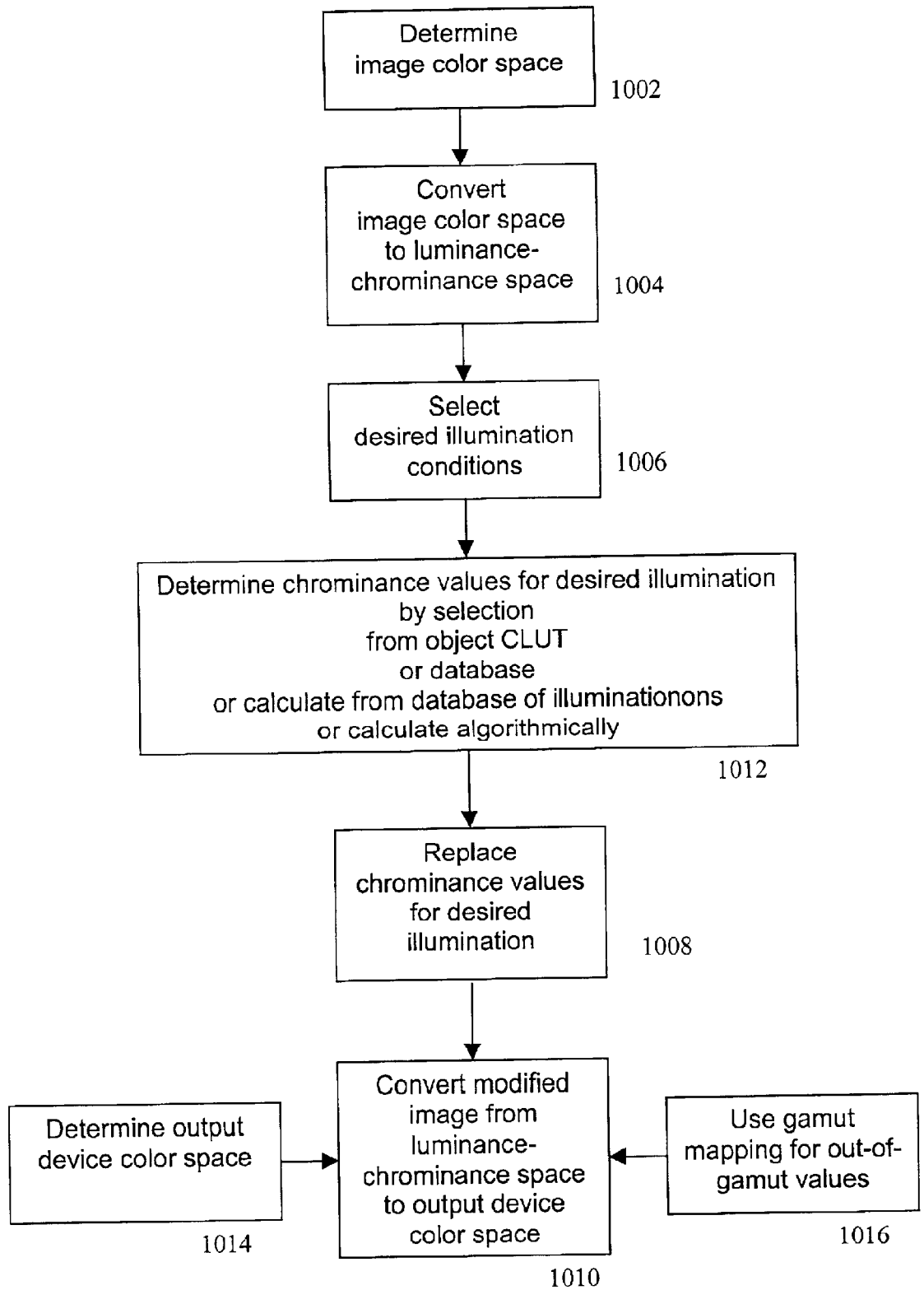
FIG. 10 is a block diagram and flow chart exemplary of an approach according to the present invention to modify the color of an object in an image for desired illumination conditions and correcting it for the output device color space.
Figure 11:
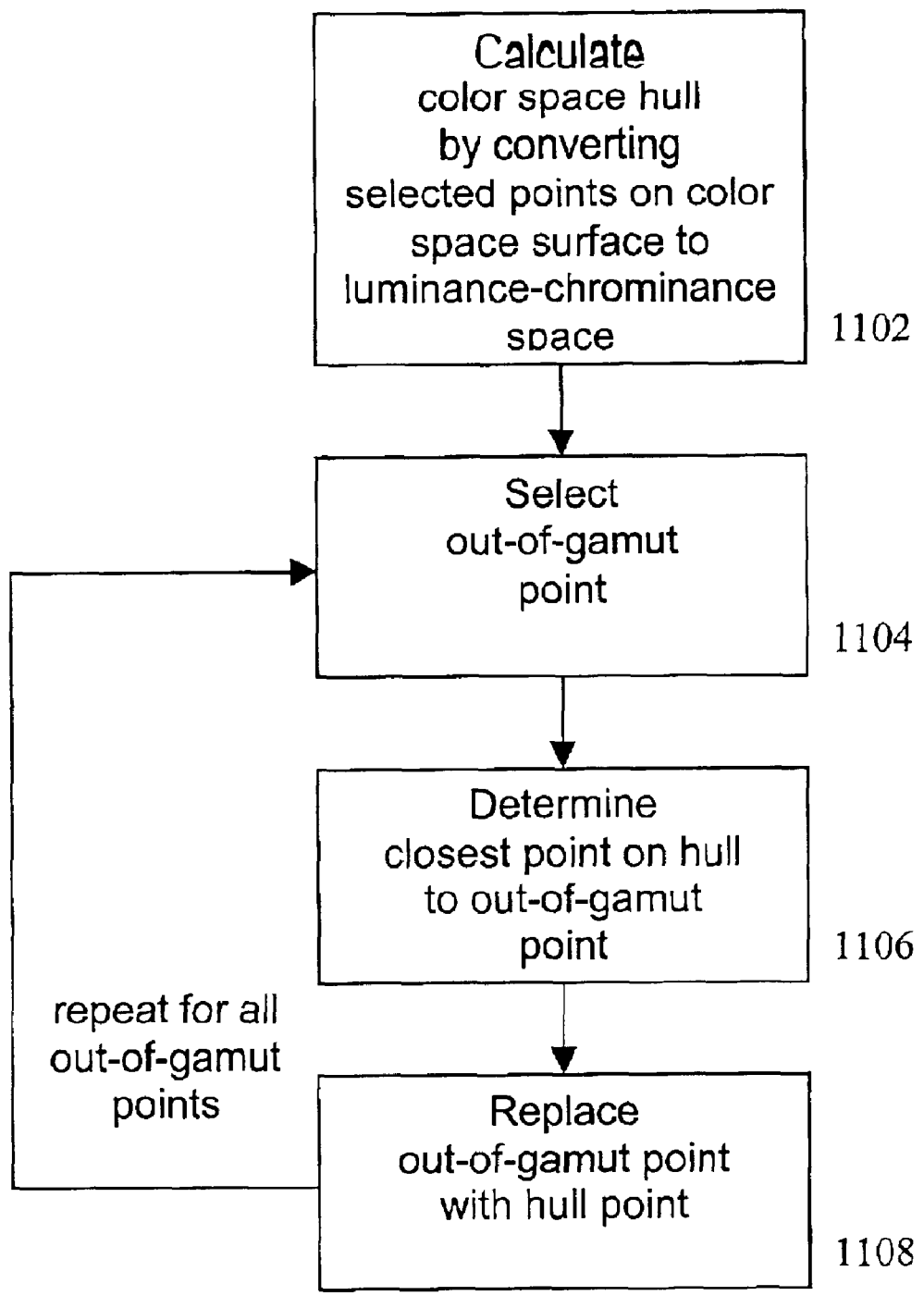
FIG. 11 is a block diagram and flow chart exemplary of an approach according to the present invention to implement a gamut-mapping algorithm.

Turning to certain embodiments of the data analysis and processing software and algorithms, illustrated in FIGS. 6–11, the computer software provides a graphical or text based (or a combination of graphics and text) user interface that provides a menu of commands and responds to a set of operator input instructions to control data analysis and processing. FIG. 6 depicts several components that measure an object's spectral absorption characteristics, or intrinsic wavelength-dependent response. FIGS. 7 and 8 depict calculating the perceived color response of the object under various illumination conditions to give an illumination-dependent color of the object. FIGS. 9, 10 and 11 depict associating the illumination-dependent color with a color value of desired pixels associated with the object in a digital image, thereby adjusting the color of the desired pixels using the illumination-dependent color to provide a different, desired color.

In FIG. 6, the software contains measurement software that calibrates 602 the data acquisition hardware and controls the data acquisition or measurement of the object's color 604 and storage of the acquired data 610. It can further contain analysis software that can accesses various databases 606, 612, 616, analyze the measured data 608, store the results 610, encode the results 614, and associate the results 618 with the image of the object 620. It can further contain image manipulation software that can access various databases 606, 612, 616, modify the image according to desired illumination conditions 622, interrogate the image-rendering device 624, correct the image for the desired image-rendering device 626 and finally render the image 628.

As shown in both FIGS. 6 and 7, the measurement software can calibrate 602, 702 the wavelength response of the measurement module 604, which can be a spectroradiometric module, and apply the calibration correction factors thus derived to the data set collected from the measurement module 604. This software can further provide for calibration of the intensity response per wavelength of the spectroradiometric measurement module to a reference source of known intensity over a range of wavelengths and can apply the calibration correction factors thus derived to the data set collected from the measurement module 604.

The measurement software can provide for acquisition/measurement 604, 704 and storage 610 of a dark or background spectrum signal data set and acquisition and storage of a measurement spectrum signal data set and subtraction of the dark or background spectrum signal data set from the measurement spectrum signal data set to generate a background corrected measurement spectrum data set.

The measurement software can also analyze the measurement spectrum data set to determine if the measurement is of acceptable signal level, and can adjust the data acquisition integration time or number of samples integrated until acceptable signal level is obtained and provide an indicator to the operator if an acceptable signal level is not obtained within the range of adjustment of the measurement module.

The measurement software then applies the wavelength and intensity calibration correction factors to the measurement spectrum data set, preferably a background corrected data set, to generate a calibrated measurement spectrum. The measured spectrum may be a reflectance spectrum or a fluorescence spectrum or a combined reflectance/fluorescence spectrum or other energy spectrum as desired.

The measurement software can analyze the calibrated measurement spectrum data set to determine if the measurement is of acceptable quality and provide an indicator to the operator if the measurement quality is not acceptable. The measurement software can then record or store 610 the acceptable calibrated measurement spectrum data set, measurement parameters, and performance indicators in a database such as an electronic or optical database.

In FIG. 7, the measurement software contains or acquires a measurement spectrum data set, preferably calibrated, from a reference object with known reflective properties 706. The measurement software then acquires a measurement spectrum data set, preferably calibrated, from an object that has been or will be imaged 708. The reference spectrum 706 and the object spectrum 708 are preferably corrected or adjusted in view of dark spectrum 704. The analysis software then calculates the object's intrinsic wavelength-dependent response from the two measurements 710.

The spectral power P that a spectrometer measures at each wavelength, $\lambda$, is a product of the spectral reflectance $R_\lambda$ of the object and the spectral power $S_\lambda$ of the illumination at that wavelength:

$$P_\lambda = R_\lambda S_\lambda$$

Measuring the spectral power of an object $P_{\lambda,obj}$ and a reference surface $P_{\lambda,ref}$ using the same illumination $S_{\lambda,ref}$, i.e., $$P_{\lambda,obj\ obj} = R_{\lambda,obj} S_{\lambda,ref}$$

$$P_{\lambda,ref} = R_{\lambda,ref} S_{\lambda,ref}$$

allows calculation of the object's intrinsic wavelength-dependent response, $$R_{\lambda,obj} = R_{\lambda,ref} P_{\lambda,obj} / P_{\lambda,ref}$$

In another embodiment the analysis software selects the object's intrinsic wavelength-dependent response 714 from a database of previously measured or artificially-created wavelength-dependent responses of the object 712.

FIG. 7 illustrates how the analysis software can calculate object color 732 under a desired illumination by calculating 726 the interaction of the object's intrinsic object-color or intrinsic wavelength-dependent response 724 with the normalized emission spectrum characteristics of the desired illumination conditions 722. Such illumination conditions may be composed of illumination sources and environmental conditions and can include different artificial lights (such as incandescent, fluorescent, halogen and xenon lamps), latitudes, altitudes, times of day and weather situations.

The software can select the desired illumination conditions 718 from a database of previously measured or artificially created illumination conditions 716 or other source of spectral data, and/or the software can calculate desired illumination conditions algorithmically 720 to provide the desired illumination 722.

In another embodiment of the invention the software does not calculate the object color under the desired illumination 722 but selects it 730 from a database of previously measured or artificially measured object colors 728 or other source of object colors.

FIG. 8 illustrates an example of how the software can construct a CLUT 810 containing object colors under various illuminations by repeating the process of calculating the tristimulus values 806 from a selected wavelength-dependent response 802 and a selected illuminant 804 and transforming the tristimulus values to a luminance-chrominance space 808 for all desired illuminants and all desired colors for which intrinsic wavelength-dependent responses are available to the software. The CLUT can be encoded 812 and associated with the imaged object.

The tristimulus values X, Y, and Z can be calculated by applying color matching functions such as those of the CIE 1931 Colorimetric Observer or the CIE 1964 Supplementary Colorimetric Observer to spectral data that are directly measured under a particular illumination or created by calculating the interaction of an illuminant with an object's spectral absorption characteristics. Suitable formulae for calculating X, Y and Z values from spectral data using the color matching functions include:

$$X = k \int_\lambda \phi(\lambda)\bar{x}(\lambda)d\lambda$$

$$Y = k \int_\lambda \phi(\lambda)\bar{y}(\lambda)d\lambda$$

$$Z = k \int_\lambda \phi\bar{z}(\lambda)d\lambda$$

Fairchild discusses the values of these variables in detail in color appearance models. The X, Y, Z values can be transformed into coordinates for various other color spaces.

In the CIELAB color space these values can be calculated using the equations.

$$L^*=116(Y/Y_n)^{1/3}-16$$

$$a^*=500[(X/X_n)^{1/3}-(Y/Y_n)^{1/3}]$$

$$b^*=200[(Y/Y_n)^{1/3}-(Z/Z_n)^{1/3}]$$

As above, Fairchild discusses the values of the variables in detail in Color Appearance Models. The L*, a*, b* values can be calculated for the spectrum of each object of interest under each illuminant of interest and stored in a color look up table, or reference data set. Alternatively, in other embodiments of the invention they can be calculated as desired or required. The luminance-chrominance values, or the chrominance values alone, can then be used as described earlier to modify the chrominance values in an image to correct color.

In another embodiment of the invention, as shown for example in FIG. 6, the analysis software records only the intrinsic wavelength dependent response of the object, and calculation of the luminance and chrominance values related to a particular illumination is performed by the image manipulation software 612, 616, 622.

FIG. 9 illustrates an example of how object colors derived from measurements, or otherwise created, can be associated with the color of a depiction of the object in an image of the object. The analysis software can select an area in the image of the object that corresponds to the area where the object color was measured or for which it was calculated 904. Such selection can be done with user interaction or automatically, e.g., by image segmentation. The analysis software can then convert the color values of the selected image pixels 906 from the image's color space 902 to luminance-chrominance space. The luminance and chrominance values can then be analyzed 908. A range of chrominance values can then be associated with the object color chrominance values 910.

Image pixel color is often encoded as digital or analog RGB values. These values are used, for example, to create voltage signals to drive the electron guns of a CRT display or the TFTs or liquid crystals of a flat panel display, or otherwise to create a desired image on a suitable medium. Video signals encoded as RGB values typically assume a particular set of color phosphors. There are a limited variety of these color phosphors and they tend to be similar depending on what color standard was historically adopted or specified in that region. A new standard has evolved that has international agreement for High Definition Television (HDTV). This standard is being adopted for most contemporary monitors used in studio video, computing, and computer graphics. This standard is referred to as Rec 709 in the color display industry and details can be found in SMPTE RP 177-1993 published by the Society of Motion Picture and Television Engineers. As one example, transformation of RGBCIEXYZ tristimulus values to an RGB color space is accomplished by performing a matrix multiplication to produce $$\begin{bmatrix} R_{709} \\ G_{709} \\ B_{709} \end{bmatrix} = \begin{bmatrix} +3.240479 & -1.53715 & [-0.498535] \\ [-0.969256] & +1.875991 & +0.041556 \\ +0.055648 & -.0.204043 & [+1.057311] \end{bmatrix} * \begin{bmatrix} X \\ Y \\ Z \end{bmatrix}$$

The inverse matrix that can be used to convert from RGB to CIEXYZ is $$\begin{bmatrix} X \\ Y \\ Z \end{bmatrix} = \begin{bmatrix} 0.412453 & 0.35758 & 0.180423 \\ 0.212671 & 0.71516 & 0.072169 \\ 0.019334 & 0.119193 & 0.950227 \end{bmatrix} * \begin{bmatrix} R_{709} \\ G_{709} \\ B_{709} \end{bmatrix}$$

A variety of transforms allow color space conversion for images produced for one particular set of phosphors but being displayed on a different set of phosphors. See Television Engineering Handbook.

In a preferred embodiment of the invention analysis of pixel values for this purpose can be accomplished by representing the range of chrominance values of the selected pixels in the form of histograms. If the CIELAB color space is used this would yield two histograms, one for the a* values and one for the b* values. Selection of a range of values from these histograms can be made by user selection or by another method, such as algorithmically by selecting the medians of the histogram values.

In a preferred embodiment of the invention the association of the selected ranges of image chrominance values with the chrominance values of the object color for one or more desired illuminations can be made by replacing the selected ranges of image chrominance values with the object chrominance values for one desired illuminant and referencing the object luminance-chrominance values for other illuminations to this color.

In another embodiment of the invention the software can create a CLUT that associates ranges of chrominance values of colors of the object in the image with object chrominance values for a range of illuminations. Other methods for making the association may also be employed.

Once the association has been made the image data can be transformed back to the original image color space or to another color space of a desired image-rendering device such as a printer or a computer monitor.

FIG. 10 illustrates an example of how the image depicting the object can be modified and corrected by the image manipulation software and algorithms using the image data and the associated object color data. The image can be modified for desired illumination conditions converting the pixel colors 1004 of the image from the image color space 1002 to luminance-chrominance space and replacing the chrominance values of the object in the image 1008 with the object chrominance values for the desired illumination conditions 1006, 1012. The image can be further modified for the desired image-rendering device 1014 by converting the luminance-chrominance values of the modified image to the color space of the desired image-rendering device 1010. The image can also be corrected by mapping out-of-gamut luminance-chrominance values to values that the desired image-rendering device can render 1016.

In a preferred embodiment the image manipulation software can use similar transformation algorithms as described above for the analysis software to convert the colors of the pixels in the image from the image color space 1002 to a luminance-chrominance space 1004. In another embodiment the image manipulation software does not convert the whole image to a luminance-chrominance space but only those parts of the image to which the image modification process will be applied, which can be referred to as segmentation.

The image manipulation software itself, or a user, can select a desired illumination condition for rendering the image 1006. The image manipulation software can then determine the chrominance values of the object's color for the desired illumination by extracting it from an associated CLUT or database, or by various calculations or algorithms. In another embodiment the image manipulation software can calculate these chrominance values from a database of illumination data, such as those, 612, 622, depicted in FIG. 6.

The image manipulation software can then replace the chrominance values of the colors of the object in the image with the chrominance values of the object for the desired illumination 1008.

In another embodiment the image manipulation software can determine the luminance values in addition to the chrominance values from a CLUT or any of the methods described above 1012 for the chrominance values alone, and replace the luminance values in addition to the chrominance values in the image 1008.

The image manipulation software can then convert the image from the luminance chrominance space back to the original image color space or to the color space of the desired image-rendering device 1010.

The image manipulation software can determine the characteristics of the image-rendering device by interrogating the device or another source of device characteristics such as a file or document 1014. Such device characteristics are known in the art and available in a variety of formats. A widely used example of such a device characteristic is an ICC profile as specified by the International Color Consortium. The image manipulation software can then determine if the color values of any image pixels in the color space of the image rendering device are out-of-gamut and correct those values so that the device can render them 1016.

An example of such correction for an image that is to be displayed on an RGB computer monitor where each R, G and B value has a maximum numerical value of 255 is a simple clipping procedure where, if the image modification and transformation resulted in any R or G or B values being greater than 255, those values are replaced by 255.

In a preferred embodiment of the invention the image manipulation software employs gamut-mapping algorithms to correct out-of-gamut color values. FIG. 11 illustrates an example of a gamut-mapping algorithm where the image manipulation software first calculates a hull of the color space of the image-rendering device in luminance-chrominance space 1102. This hull can be calculated by converting all points on the outer surface of the device color space to luminance-chrominance space. Alternatively, a hull may be calculated only from selected points on the device color space surface. Any out-of-gamut image pixels that have luminance-chrominance values that lie outside the hull 1104 can be mapped onto the hull by calculating a desired point on the hull, typically the point closest to the out-of-gamut point 1106, and replacing 1108 the luminance-chrominance values of the out-of-gamut point with the luminance-chrominance values of this closest hull point. Alternatively, only the chrominance values may be replaced. After all desired out-of-gamut points have been mapped and the image has been converted to the color space of the image rendering device, the device will be able to render all the pixels of the corrected image.

Figure 12:
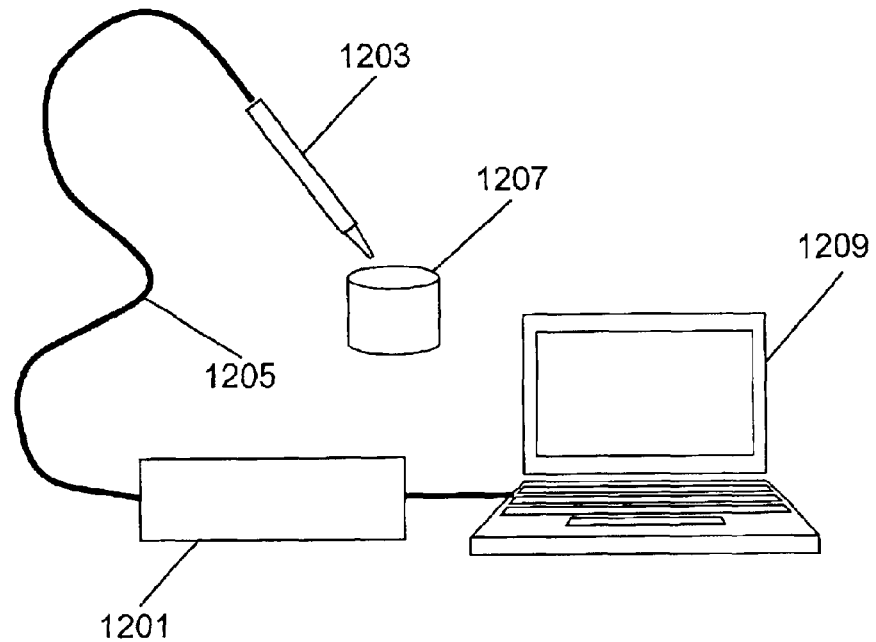
FIG. 12 is a schematic diagram exemplary of a color measurement system according to the present invention incorporating a hand-held measurement probe.

Turning to some depictions of systems and devices suitable for use in the present invention, FIG. 12 shows a schematic representation of a measurement system including a measurement module 1201, which can comprise a spectroradiometer, can comprise an illumination unit and spectroradiometric measurement unit. Spectroradiometric measurements are preferably made using a calibrated spectrometer operated under software control by software installed on computer 1209 operably connected to measurement module 1201. Such spectrometers are known in the art and are commercially available from suppliers such as Ocean Optics Inc. of Dunedin, Fla.

A measurement probe 1203, typically hand-held, is coupled to the spectroradiometer and light source, for example by flexible fiber optic and control assembly 1205 that directs the illumination light from the illumination source to the hand-held measurement probe and thence via the optical elements of the probe to the object 1207 to be measured. As one alternative, the spectroradiometer and/or the light source can be included in the hand-held mechanism. The probe is placed in optical contact with the object, preferably via close proximity, physical contact or via a system such as an extensible sleeve that keeps undesirable light out of the measurement area. The diffusely reflected light from the object is collected by the optical elements of the hand-held probe and directed through the flexible fiber optic assembly to the spectroradiometer.

Figure 13:
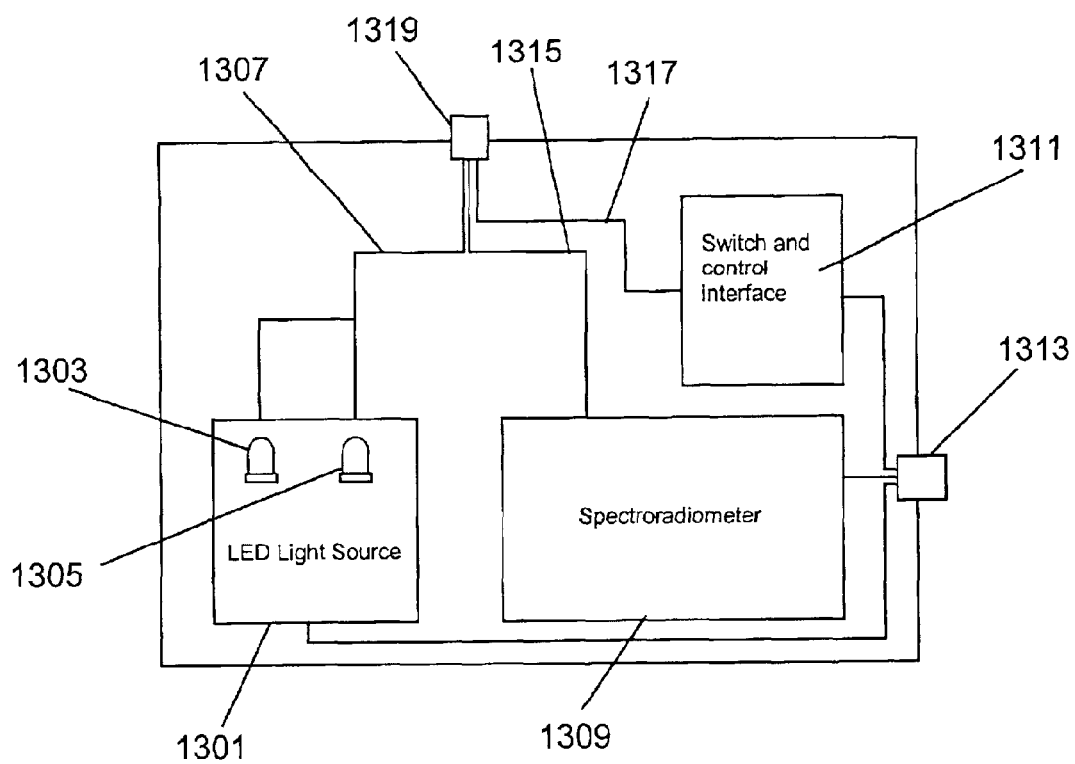
FIG. 13 is a block diagram exemplary of a color measurement module according to the present invention incorporating a light source, spectroradiometer and control interface.

FIG. 13 shows a block diagram exemplary of a preferred embodiment of a measurement module 1201. The measurement module comprises a light emitting diode (LED) light source 1301 comprising two or more LEDs 1303,1305 and associated electronics. LED 1303 provides illumination suitable to determine certain fluorescence characteristics of the object to be measured. LED 1305 in combination with or separately from LED 1303 provides illumination suitable to determine certain reflectance characteristics of the object to be measured. Light from LED 1305 and LED 1303 is directed via flexible light guide 1307 through light guide assembly 1205 to hand-held probe 1203 where the light is directed onto object 1207 to be measured. Flexible light guide 1307 may comprise one or more flexible light guides bundled together, or light may be optically directed from one or more light sources or light guides and mixed into one or more subsequent light guides which will direct the illumination light to the object to be measured. Measurement module 1201 further comprises spectroradiometer 1309 and switch and control interface 1311. Light source 1301 and spectroradiometer 1309 are operably connected to interface 1311. Light source 1301, spectroradiometer 1309, and control interface 1311 are also operably connected via port 1313 to computer 1209. Spectroradiometer 1309 receives light reflected or otherwise emitted from object 1207 via light guide 1315.

In some embodiments, the spectral measurement system, such as the spectroradiometer and associated components, can resolve the intrinsic wavelength-dependent response or illumination-dependent response of an object, a light source, or other target to about 10 nm, typically about 5 nm, and preferably about 2 nm. The system can comprise an illumination light source having a known energy spectrum and computer-implemented programming that correlates the response from an object illuminated by illumination light from the illumination light source with the known energy spectrum and therefrom determines the intrinsic wavelength-dependent response of the object.

Flexible light guide 1315 may comprise one or more flexible light guides bundled together, or light may be optically directed from one or more light guides and mixed into one or more subsequent light guides which will direct the illumination light to spectroradiometer 1309 to be measured. Switch and control interface 1311 comprises electronic components and may comprise microprocessors or micro-controllers that may control signals to and from LEDs 1301, 1305, spectroradiometer 1309 and switches or other controls of probe 1203. Switch and control interface 1311 is operably connected to probe 1203 by control lines 1317. Control lines may transmit electrical or optical control signals and may be constructed from one or more electrical or optical conductors. Light guides 1307 and 1315 and control lines 1315 are combined into flexible fiber optic and control assembly 1205 at port 1319. In a preferred embodiment of the invention flexible fiber optic and control assembly 1205 comprises a flexible tubular conduit that contains and protects the light guides and control lines between measurement module 1201 and hand-held probe 1203.

The hand-held probe typically incorporates control switches to initiate a measurement, although the switches can be located elsewhere on the system if desired. For example, one control switch can be a two-position latching switch that determines whether the measurement will be triggered by a push-button or pressure sensitive switch. A second control switch can be a finger actuated momentary push-button switch that will trigger actuation if the push-button position is selected by the first switch. A third control switch can be a spring-loaded and/or pressure sensitive switch that triggers a measurement when the probe is placed in close proximity to the object.

In a preferred embodiment of the invention the probe tip can be shaped such to exclude undesirable light, for example the probe can be formed such that the light-gathering element of the probe is recessed or is equipped with a flexible shroud that prevents ambient light from interfering with the measurement of the object. If it is desirable to have the point of measurement visible then the shroud can be removed and the measurement made in a room or chamber that excludes any ambient light that would confuse the measurement.

FIGS. 14a–c show several longitudinal cross-section views of a preferred embodiment of a hand-held probe. FIG. 14a and 14c are detail views of FIG. 14b. FIG. 14b shows the hand-held probe and a portion of the fiber optic and control assembly connected to it. The probe is shaped to be held like a pen in the hand of the operator. The probe comprises a substantially tubular component, or tube, 1401 connected to tip assembly 1403 and end-plug 1405. End-plug 1405 comprises a substantially cylindrical object equipped with a concentric channel sized to accept and hold the outer conduit 1407 of the fiber optic and control assembly. End-plug 1405 is shaped to be fitted into tube 1401. Conduit 1407 passes through end-plug 1405 and most of tube 1401 and is inserted into a passage 1409 in tip 1403. Passage 1409 is shaped to allow conduit 1407 to be inserted a short fixed distance. Conduit 1407 may be secured in tip 1403 and end-plug 1405 by a locking screw, adhesive, crimp or other suitable method of retention.

Tip 1403 is substantially cylindrical with a tapering conical end 1411 and a concentric passage 1413. Tube 1415 is fitted into passage 1413 and protrudes from conical tip 1403. Flexible light guides 1417 are guided through tube 1415 to terminate distally at measurement port 1419. The proximal ends of flexible light guides 1417 are directed back into conduit 1407 and thence to the illumination and spectroradiometer assemblies. Tip 1403 also comprises a chamber that provides a platform 1423 on which may be mounted circuit board 1425 on which in turn switch 1427 may be mounted. Actuator button 1429 of switch 1427 is accessible to operator control through opening 1431 in tube 1401. The distal end of control wires 1433 are connected to switch 1427 via circuit board 1425. Control wires 1433 pass into conduit 1407 and are connected proximally to a control interface board in the illumination and spectroradiometer assemblies. Switch 1427 comprises an input device that can provide operator input signals to the measurement and control software programs.

FIGS. 15a–b are side front elevational views of a preferred embodiment of the invention, showing tapered conical end 1411 and a detail of tube 1415 and measurement port 1419 where flexible light guides 1417 comprise seven optical fibers arranged in a hexagonal array.

The illumination unit comprises a lamp and a lamp power supply. If desired, the unit can further comprise an optical relay system that accepts illumination energy from the lamp and transmits it to the object. In a preferred embodiment of the invention the lamp is an LED-based lamp comprising one or more LEDs, for example from suppliers such as Nichia America Corporation. The lamp can also be a tungsten filament technical lamp with a known continuous temporally stable output spectrum, for example from Gilway Technical Lamp.

The lamp can also be a pulsed lamp such as a pulsed xenon lamp. A pulsed lamp provides short duration, intense illumination, that when combined with high speed, and synchronized measurement data acquisition can significantly reduce the effect of ambient illumination on a measurement. Pulsed xenon lamps are commercially available from suppliers such as Perkin-Elmer Corporation.

The measurement unit comprises a spectrometer, preferably a spectroradiometer such as a calibrated spectrometer, optically connected to the measurement probe, preferably a hand-held probe. The connection can be by flexible light guide comprising a fiber optic or liquid light guide.

The illumination energy (e.g., the illumination light) is directed onto the object to be measured. This can be done in any desirable manner, for example via the flexible light guide and the directing optical elements of the hand-held probe, or directly by shining the light source onto the object. Light emanating from the object is collected by optical elements of the probe and is conducted to the spectrometer by a light guide such as a liquid light guide, optical fiber, optical fiber bundle or a hollow fiber, that conducts light by internal reflection from an entrance aperture to an exit aperture, or other suitable optical pathway. An optical fiber is a fiber composed of two concentric regions of optically transmissive material with different refractive indices that transmits light axially by internal reflection at the boundary of the two materials. In the case of gradient refractive index material this boundary may be diffuse rather than abrupt.

In one embodiment, the spectrometer comprises an entrance port and optics to direct the beam to a wavelength dispersive grating or other spectrum-separating element and then to a CCD array detector or other suitable detector, typically a pixelated detector such as a CID detector, where the optical energy is transduced into electrical energy that can be measured. The array detector signal can be calibrated for wavelength and spectroradiometric response over a suitable wavelength range, for example in the UV, Visible or NIR regions of the electromagnetic spectrum. Such spectrometers are known in the art and are commercially available from manufacturers such as Ocean Optics of Dunedin, Fla. Other wavelength dispersive elements including prisms, and other transducing detectors and detector arrays, are known in the art and can be employed in view of the present application.

If desired, the spectrometer can be electrically connected to a serial interface board that performs analog to digital conversion of the measurement signal and then transfers this digital information via a data cable or other suitable connection to the serial data port of the system controller. Other architectures of analog to digital signal conversion and of digital data transfer to the system controller are known in the art and can be employed in view of the present application.

From the foregoing, it will be appreciated that, although specific embodiments of the invention have been described herein for purposes of illustration, various modifications may be made without deviating from the spirit and scope of the invention. Accordingly, the invention includes all permutations and combinations of the subject matter set forth herein and is not limited except as by the appended claims.

What is claimed is:

1. A computer-implemented method of adjusting at least one color of at least one first object in a digital image comprising:
   a) providing the image containing the object and determining the chrominance values of the first object in the image;
   b) providing a reference data set comprising an illumination-dependent color of the first object that represents the color of the first object under a desired illumination condition;
   c) adjusting the chrominance values of the first object in the image using the reference data set to provide a different desired color of the first object in the image that represents the color of the first object under the desired illumination condition,
   and wherein the image includes at least a second object in the image, and the image comprises pixels and the method further comprises adjusting all pixels in the image that have chrominance values similar to the chrominance values of the first object prior to chrominance adjustment, such that their adjusted chrominance values are substantially the same as those of the pixels corresponding to the first object after chrominance adjustment.

2. A computer-implemented method of adjusting at least one color of at least one object in a digital image comprising:
   a) providing the image containing the object and determining the chrominance values of the object in the image;
   b) providing a reference data set comprising an illumination-dependent color of the object that represents the color of the object under a desired illumination condition;
   c) adjusting the chrominance values of the object in the image using the reference data set to provide a different desired color of the object in the image that represents the color of the object under the desired illumination condition,
   and the method further comprises limiting the colors to be corrected to chrominance values characteristic of diffuse reflection.

* * * * *